United States Patent [19]

Mower

[11] 4,296,521
[45] Oct. 27, 1981

[54] WIPER BLADES
[75] Inventor: Peter Mower, Twickenham, England
[73] Assignee: Trico Products Corporation, Buffalo, N.Y.
[21] Appl. No.: 119,127
[22] Filed: Feb. 6, 1980
[30] Foreign Application Priority Data
  Feb. 13, 1979 [GB] United Kingdom ................. 5036/79
  Apr. 4, 1979 [GB] United Kingdom ............... 11853/79
[51] Int. Cl.³ .............................................. B60S 1/40
[52] U.S. Cl. ................................................ 15/250.32
[58] Field of Search ........................ 15/250.32–250.35, 15/250.42

[56] References Cited
U.S. PATENT DOCUMENTS
3,928,887 12/1975 Lopez et al. ...................... 15/250.42
4,028,770 6/1977 Appel ............................... 15/250.42
4,142,268 3/1979 Brown et al. .................... 15/250.32
4,178,651 12/1979 Mayer ............................. 15/250.32

FOREIGN PATENT DOCUMENTS
1254109 11/1971 United Kingdom ............. 15/250.32
1376878 12/1974 United Kingdom ............. 15/250.32

Primary Examiner—Peter Feldman
Attorney, Agent, or Firm—E. Herbert Liss

[57] ABSTRACT

There is described the combination of a connector, which is an elongate element having parallel side faces and penetrated by a bore perpendicular to the side faces, and a pivot pin which is, in use, received in the bore and protrudes from both ends thereof, the pivot pin being retained in the bore by means of a resiliently supported projection extending either radially into the bore or radially outwardly from the pin, the resilient projection engaging the side walls of either a groove formed in the pin, or of a recess formed in the connector and communicating with the bore. The connector is situated, in use, in an elongate opening in a wiper blade harness, parallel side walls of the opening being formed with holes into which the ends of the pin project to mount the connector pivotally to the wiper blade harness, and the connector is adapted to engage and retain an end of a windscreen wiper arm to effect a pivotal connection between the arm and the blade harness.

6 Claims, 11 Drawing Figures

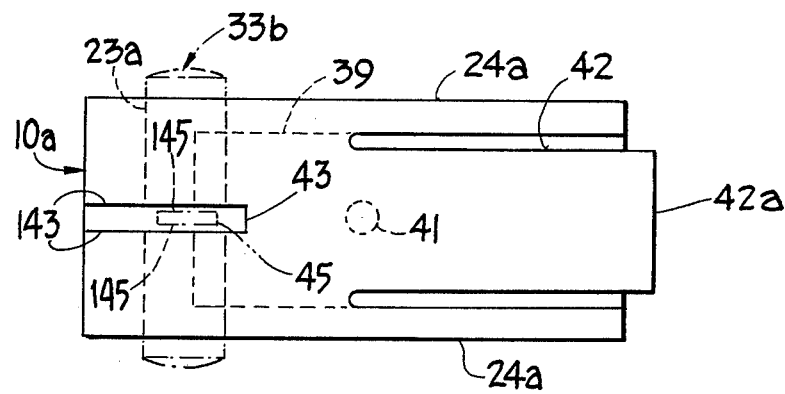
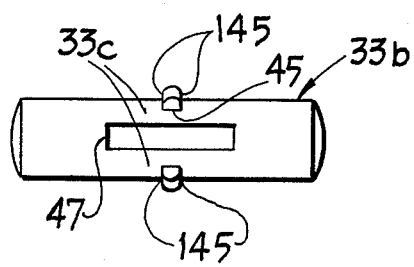
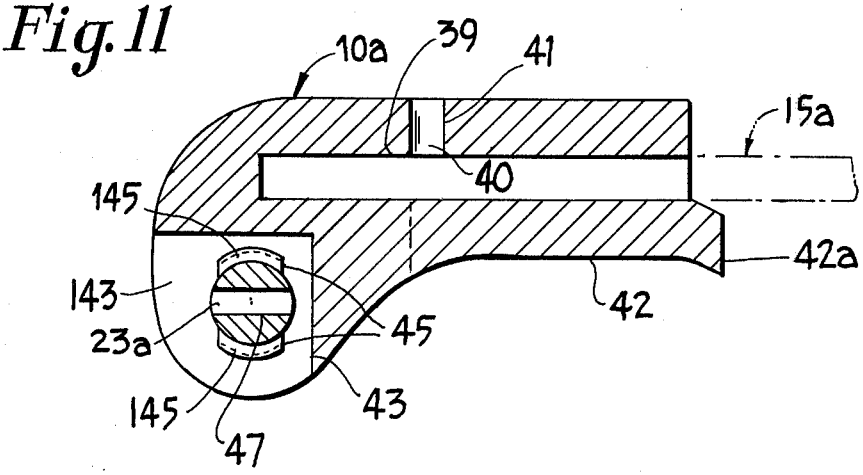

WIPER BLADES

This invention relates to wiper blades for vehicles and more particularly to a connecting clip for connecting an arm to a blade which can be mounted pivotally between parallel side walls of an opening between the ends of the wiper blade.

Various prior proposals have been made, for example in U.K. patent specifications Nos. 1,295,596 to SWF and 1,376,878 to Baut which disclose a bearing pin forming a part of a wiper blade, and a connector for retaining an end portion of a wiper arm which is, respectively, detachably and permanently mounted for pivoting on the bearing pin.

A mounting clip arrangement is shown in U.S. Pat. No. 4,094,039 to Waterman et al having depending spaced flanges which are received between the parallel side walls of the blade harness. Each of the flanges has a locking button formed thereon which is guided by ramp sections into locking engagement with aligned openings in the harness sidewalls. Either the flanges or the blade side walls must be of flexible plastic to permit assembly while the connecting clip blade, harness and pin of the instant invention may be of any suitable or desirable material. The flexibility required for the Waterman et al assembly could result in inadvertent disengagement.

In U.K. patent specification No. 1,535,122 to Bosch a connecting clip construction similar to the Waterman et al design is disclosed. In this example the pivot pins are formed on extensions of the connecting clip which are resiliently movable toward each other. Bosch proposes various retention means such as hooks which engage over the side walls of the blade harness and thermal or ultrasonic deformation of the free ends of the hinge pins after assembly.

In the Baut and Bosch specifications a forming operation is disclosed to retain the pin. It is evident that, although in Waterman et al and SWF the problem of positive retention of the pin is not considered, some such means is required for certain conditions of operation. The forming operation entails forming a head at one or both ends of the pin in the manner of rivetting. As this forming operating is usually carried out on a completed wiper blade harness which, if of metal, means after paint or other finish has been applied to the harness, the head on the pin needs to be painted or otherwise finished for weather-proofing or appearance sake, and the paint or finish on the harness around the head on the pin needs to be inspected, and restored or treated if damaged by the head forming operation.

The present invention resides in the combination of a connecting clip or connector and a bearing pin for use therewith for pivotally connecting a wiper arm to a wiper blade which has between its ends an opening with opposite parallel side walls for receiving the connector and the arm for pivotal movement, the connector being elongate and having a pair of opposite parallel external side faces, a portion for supporting an end portion of the wiper arm longitudinally of the connector and on which portion of the connector there is provision for retaining the end portion of the wiper arm, and a transverse bore or opening extending at right angles to the side faces for receiving the pin, the pin being longer than the distance between the side faces and retainable in the bore by cooperation between abutment surfaces on the connector and the pin, the abutment surfaces coming into interlocking relationship with a snap action, the ends of the pin, when the pin is so retained in the bore, protruding from the side faces of the connector for pivotal engagement in corresponding holes in the side walls of the wiper blade opening.

An object of the present invention is to provide a connecting clip for windshield wiper assemblies which will be positively retained in assembly under extreme conditions of operation and which simplifies and facilitates assembly.

Another object of the invention is to provide a connecting clip for windshield wiper assemblies which can be used with a harness of metal or plastic and a pivot pin of metal or plastic or any other suitable or desirable material.

A further object of the invention is to provide a connecting clip for windshield wiper assemblies utilizing a one piece hinge pin providing a continuous bearing surface.

A further object of the invention is to provide a connecting clip for windshield wiper assemblies which eliminates a head forming operation during assembly, its attendant costs and disadvantages.

Other objects and advantages of the invention will be apparent from the following detailed description taken in connection with the accompanying drawings.

FIG. 9 is an underside plan of a third connector, and

FIG. 10 is a side view of a bearing pin for use with the third connector; and

FIG. 11 is a longitudinal section of the third connector and its bearing pin in assembly.

Similar reference numerals are applied to corresponding parts in the drawings of the connectors and bearing pins.

Figure 1:
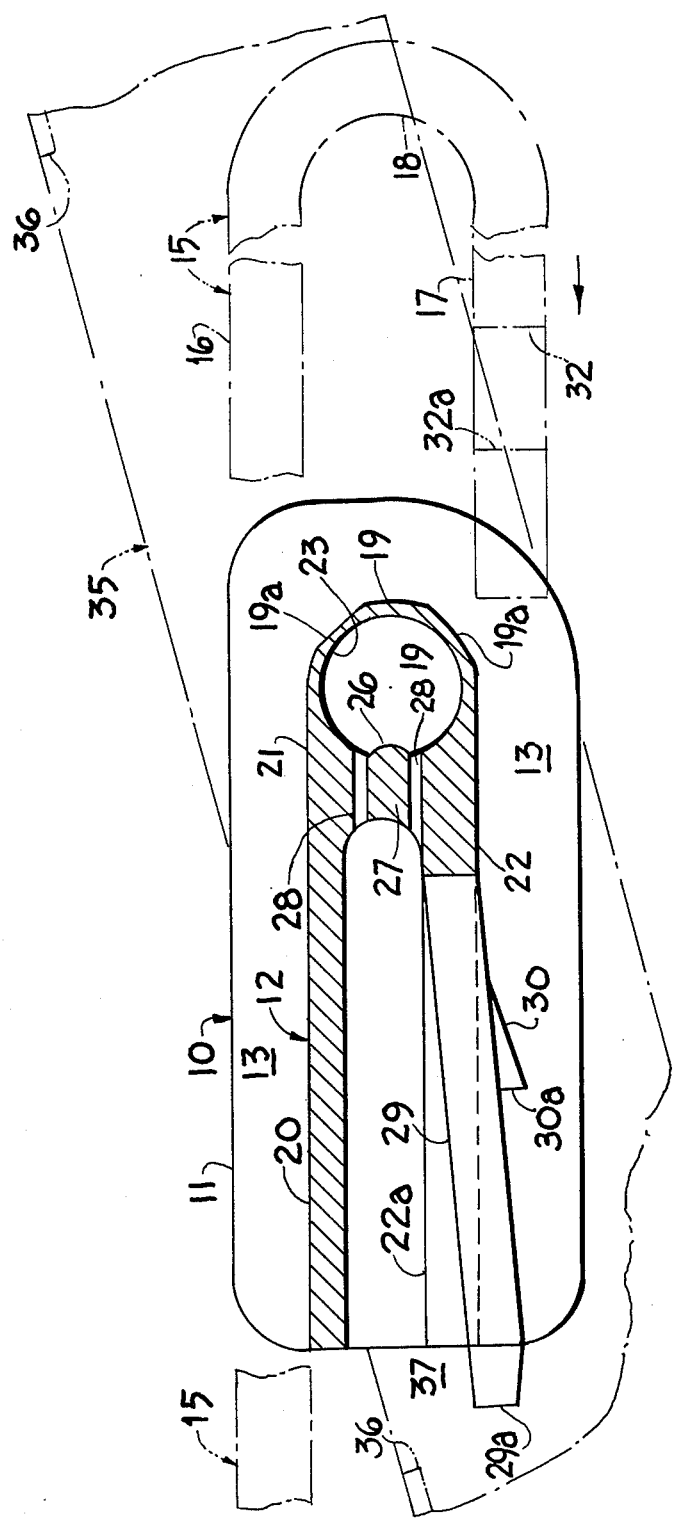
FIGS. 1 to 3 show a longitudinal section, an underside plan and an end view, respectively, of a first connector.
Figure 2:
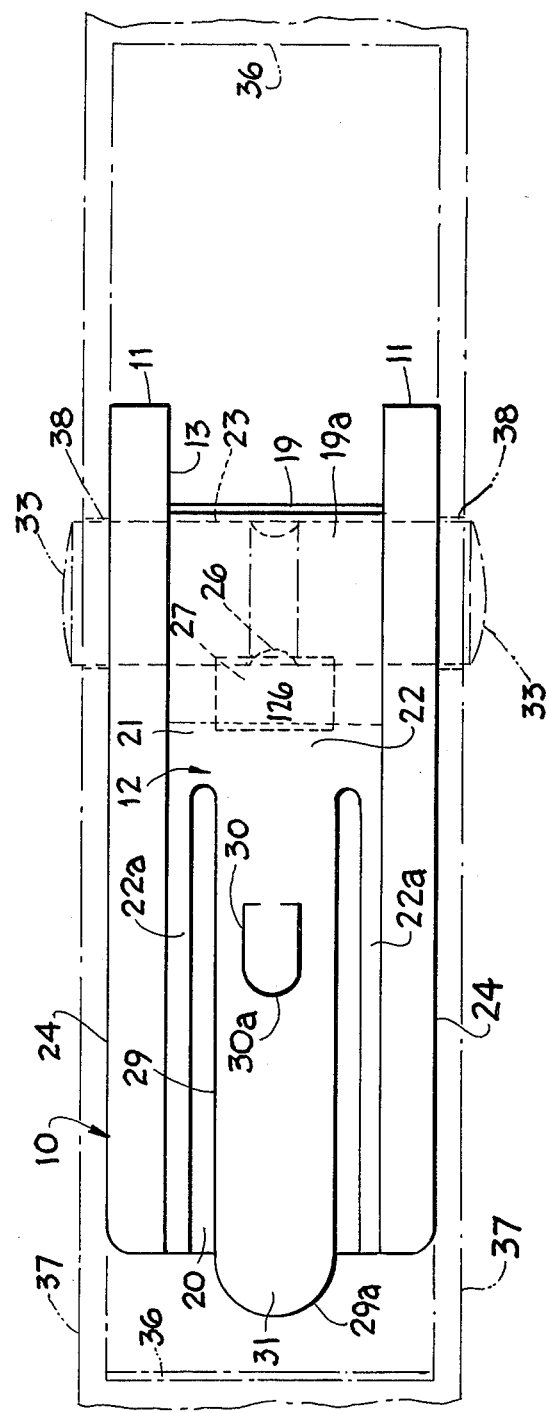
Figure 3:
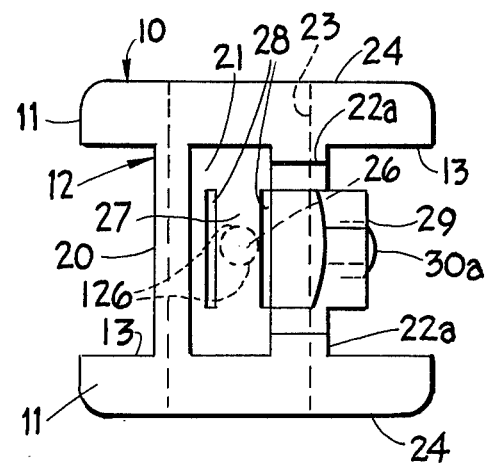

Referring to the drawings, the connector or connecting clip 10 shown in FIGS. 1 and 2 is a unitary, elongate molded plastics body of substantially H-section as viewed in FIG. 3, comprising equal opposite parallel side plates 11 united by a web 12 to provide a groove 13 corresponding in form, width and depth to a U-shape hook termination of a wiper arm 15 of rectangular cross-section, shown in chain line in FIG. 1. Upper and lower parallel portions 16, 17 of the hook lie longitudinally of the connecting clip 10 for support in corresponding portions of groove 13 of the connecting clip when in assembly, and a semi-circular curved portion 18 of the hook lies in a corresponding arcuate portion 19 of the groove 13.

The web 12 itself resembles a strip as seen in FIG. 1 and comprises an upper straight portion 20 which extends from the left hand end of the connector 10 and parallel to the longitudinal edges of the side plates 11; an intermediate portion 21, and a lower straight portion 22 parallel to the upper portion 20.

The intermediate portion 21 of the web features a cylindrical bore or transverse opening 23 which extends transversely of the connecting clip at right angles to its opposite external side faces 24 which are parallel. To the right of the transverse opening 23 as seen in FIG. 1, part of the external surface of the arcuate portion 19 is semi-cylindrical and substantially coaxial with the bore 23 but is flat or otherwise relieved at 19a above and below that part of the surface. To the left of the bore 23, the web portion 21 provides a rounded projection 26 which protrudes into the bore 23 at mid-length towards the bore axis. Opposite sides of the projection 26 afford abutment surfaces 126 as later described. The projection 26 is integral with a bar-like element 27 formed parallel to the bore 23 during moulding of the connector using a core which forms two slots 28 above and below the element 27, thereby demarcating it from adjoining parts of web portion 21. The element 27 provides resilient support to the projection 26.

The lower portion 22 of the web divides into two side parts 22a to the left of the intermediate portion 21, and between these two parts 22a there extends a straight tongue 29 which inclines outwards away from the upper portion 20 of the web. The tongue carries a detent 30 with an abutment surface 30a and has a free end 29a beyond the left hand ends of the side plates 11. The tongue is resilient in a plane parallel to the side plates 11 so that the detent 30 can be engaged in an opening 32 in the lower portion 17 of the wiper arm hook and can catch the wall or abutment surface 32a of an opening 32 in the wiper arm as hereinafter described.

Figure 4:
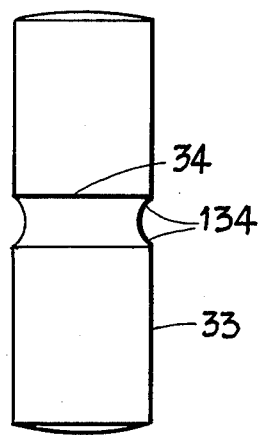
FIG. 4 is a plan of a bearing pin for use with the connector.

The separable bearing pin 33, FIG. 4, may be of plastics or metal, and is substantially cylindrical and of slightly less diameter than the bore 23 into which it is received when assembled with the connector 10. At mid-length the pin 33 is formed with a circumferential groove 34 of U cross-section which can receive the projection 26 with palpable clearance in the axial sense of the pin. Opposite sides of the groove 34 afford abutment surfaces 134 for cooperation with abutment surfaces 126 on the pin as later described.

The connector 10 is used in conjunction with the pin 33 to establish a pivotal connection between the wiper arm 15 and a wiper blade 35, a fragment of which is shown in chain line in FIGS. 1 and 2. The connector is assembled in an opening 36 defined by stiff, parallel side walls 37 of the wiper blade 35. The spacing of the side walls 37 is slightly greater than the width of the connector between its external side faces 24 so that the connector can pivot freely in the opening 36. The transverse opening 23 of the connecting clip 10 terminates in a pair of aligned holes through the side faces 24; it is aligned with corresponding aligned holes 38 in the opposite parallel side walls 37 of the wiper blade. During assembly procedure the bearing pin 33 is first aligned with the first pair of aligned holes 38 and bore 23 and pushed into them by hand, the pin 33 having a running fit in the first pair of aligned holes 38 and a sliding fit in the transverse opening 23 and the second pair of aligned holes through the side faces 24 at the ends of the transverse opening 23. The leading end of the pin encounters projection 26 and pushes it back in opposition to resilient force exerted by element 27. Projection 26 snaps into groove 34 in the pin 33 on the pin reaching its working position in the assembly and the pin is thereby retained by cooperation between the abutment surfaces 126, 134 which come into interlocking relationship with a snap action, the ends of the pin, when the pin is so retained in the bore, protruding from the side faces 24 of the connecting clip 10 and bearing in the holes 38 in the wiper blade for pivoting. The end of the wiper arm 15 can be hooked on to the connector 10 either before or after mounting the connector on the wiper blade 35. In either case, the hook end of the wiper arm is drawn on to the connector so that the straight portions 16, 17 of the hook lie along the groove 13 of the connector. The arm and connector become fully assembled when the curved portion 18 of the hook engages the arcuate portion 19 of the web. Just before the arm engages the portion 19, the detent 30, urged by the resilient tongue 29, snaps into the opening 32 in the arm. The arm is secured against further longitudinal movement in relation to the connector, on the one hand by engagement of the arcuate portion 19 and the curved portion 18, and on the other hand by abutment surface 30a on detent 30 catching the surface 32a of the wiper arm opening 32.

The connector thus establishes pivotal connection between the wiper arm and blade.

The wiper arm can be released by deflecting the free end 29a of the tongue 29 upwardly (FIG. 1) by hand to lift the detent 30 clear of the opening 32 and sliding the wiper arm to the right until the hook is clear of the connector and can be withdrawn from the wiper blade opening 36.

Once the wiper arm has been disconnected, the connector can, if desired, be dissembled from the wiper blade by forcing the bearing pin 33 from the holes 38 and the bore 23, and then withdrawing the connector from the wiper blade opening 36.

Figure 5:
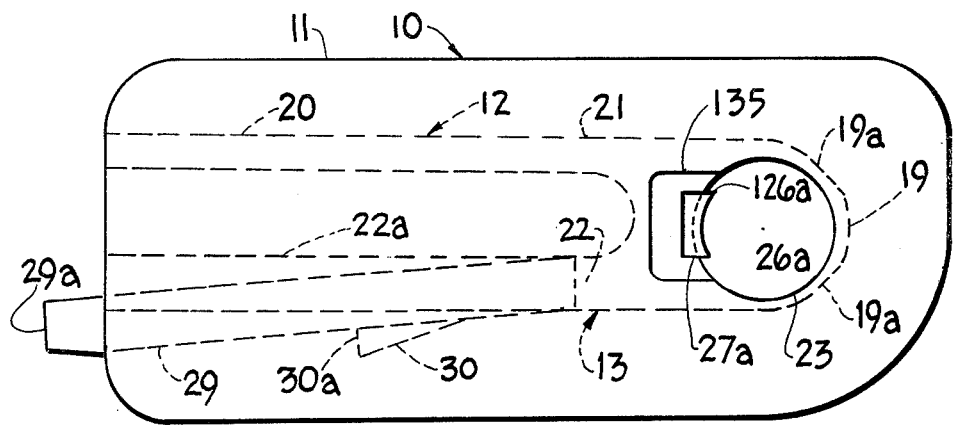
FIGS. 5 to 7 are views of a second connector in side elevation, underside plan and end view, respectively.
Figure 6:
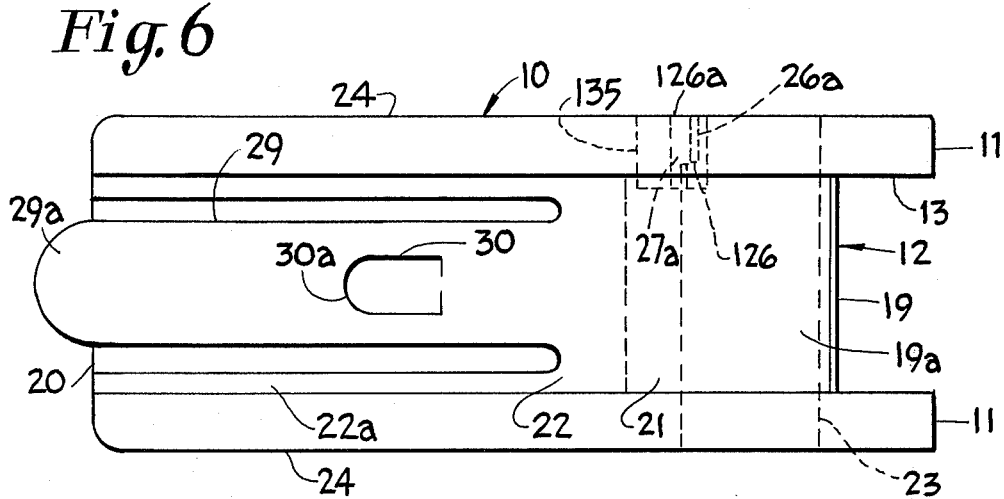
Figure 7:
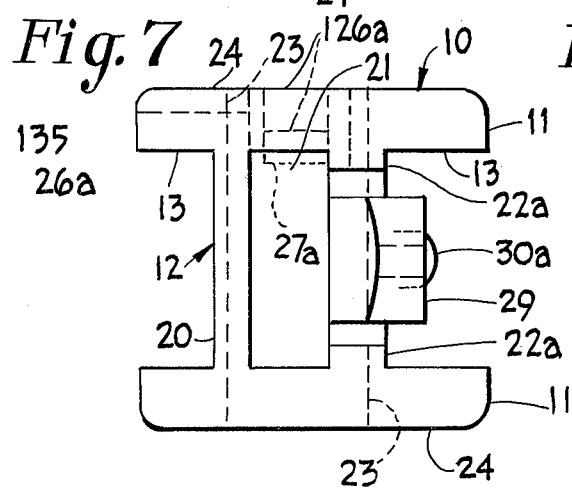
Figure 8:
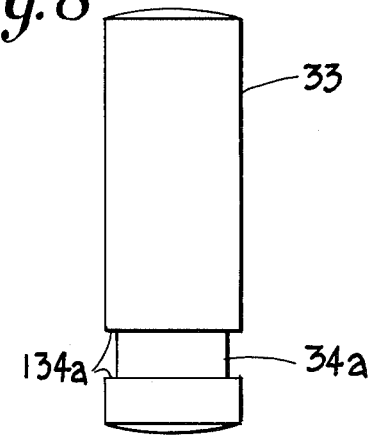
FIG. 8 is a plan of a bearing pin for use with the second connector.

The second connector, FIGS. 5 to 7, differs from the first connector in the form and location of the element and projection used, and the bearing pin, FIG. 8, for use with the second connector is shaped accordingly.

The element 27a of the second connector extends as a cantilever parallel to the axis of bore 23 to one end of the bore from inside a recess 135 in the outer face of one of the side walls of the connector and open to the bore 23. The free end of the cantilever element 27a is formed with a lateral projection 26a which normally protrudes into the bore 23 toward its axis. The projection 26a has a cylindrically concave face coaxial with the bore 23 and radial opposite sides or abutment surfaces 126a.

The other features of the second connector correspond with those of the first connector, as indicated by the corresponding reference numerals.

The bearing pin 33, FIG. 8, is formed with a circumferential groove 34a adjacent to one end for reception of the projection 26a. The sides or abutment surfaces 134a of the groove 34a are preferably radial.

Application and assembly procedure of the second connector and bearing pin correspond with those of the first connector and bearing pin.

Either form of connector illustrated may be moulded to provide a socket or passage for reception and retention of a straight ended wiper arm, at right angles to the bore 23.

FIGS. 9 and 11 show a third connector 10a moulded for reception of a straight ended wiper arm of rectangular cross-section. FIG. 11 shows in chain line the arm 15a assembled with the connector.

FIG. 10 shows a bearing pin 33b for use with this connector 10a but it is to be understood that bearing pin 33b can be used with either of the first two connectors if they are moulded to provide appropriate abutment surfaces, which are described hereinafter with reference to FIGS. 9 and 11.

The connector 10a is an elongate moulding having a pair of opposite parallel external side faces 24a (FIG. 9) and a longitudinally extending socket 39. The entrance to the socket has, as its underside, the customary resilient tongue 42, the free end 42a of which can be manipulated to deflect it downwards from its position in FIG. 11 to assist insertion of the arm 15a and principally the forcing of a stop 40 formed on the arm through the entrance of the socket to locate it in a hole 41; alternatively, to assist withdrawal of the arm from the socket.

A bore 23a for reception of the bearing pin 33b extends transversely of the connector 10a, at right angles to the side faces 24a. The bore 23a is intersected at right angles by the opposite sides or abutment faces 143 of a recess 43 which extends away from the bore between its outer ends.

The bearing pin 33b (FIG. 10) is of substantially cylindrical form, corresponding in diameter to the bore 23a in which it has a sliding fit, with the exception of resiliently supported projections 45 protruding from the circumferential surface of the pin 33b. Two such projections 45, arranged diametrically opposite each other, are shown present in FIGS. 10 and 11, but a single such projection is adequate. Each projection 45 is formed on a segmental supporting portion 33c of the pin, produced by dividing the pin longitudinally with a slot 47 between the ends of the pin; and the projection can have the rib form shown, extending circumferentially and having radial sides 145 joined by a rounded crest. Each supporting portion 33c has resilience radially of the pin to afford the corresponding projection 45 resilient support.

The connector 10a, either before or after being assembled with the wiper arm 15a, is assembled in an opening corresponding to opening 36 in the wiper blade shown in FIGS. 1 and 2. The side faces 24a of the connector 10a have just sufficient clearance between the opposite sides of the blade opening to permit free pivoting.

The connector 10a is supported for pivoting in bearing holes in the opposite sides of the blade by insertion of the pin 33b by hand. Projections 45, on encountering the sides of the bearing hole into which the pin 33b is being inserted, and of the bore 23a, are forced radially inwards against the resilience of the supporting portions 33c of the pin, the slot 47 being of width adequate to allow the pin portions 33c to flex inwards simultaneously and permit the projections 45 to enter the bearing hole in the blade and bore 23a in the connector. The projections 45 snap radially outwards inside the recess 43 under the resilience of their supporting portions 33c. The opposite sides 145, 143 of the projections and of the recess, respectively, cooperate as abutment surfaces in interlocking relationship and retain the pin 33b with its ends protruding from the side faces 24a of the connector as indicated in chain line in FIG. 9, to engage in the bearing holes in the wiper blade for pivoting.

It should now be apparent that a unique connecting clip for securing a windshield wiper arm to a blade has been provided which utilizes a separable pin to secure the connecting clip to the blade wherein the pin interlocks with the connecting clip to retain the blade and clip in assembled condition, eliminating the need for forming the head at one or both ends of the pin. This simplifies and economizes the manufacture of blades and eliminates the attendant disadvantages involved in a forming operation such as possible damaging of the finish on the blade, provides a continuous journaling surface for the hinge pin and positive retention. Although certain specific embodiments of the invention have been described for the purposes of illustration, it will be apparent that various modifications and other embodiments are possible within the scope of the invention. For example, other and different type means for supporting the end portion of the wiper arm may be utilized to accomodate wiper arms of various designs. The configuration of the areas surrounding the pin receiving bore may be of different shape and design. It is to be understood, therefore, that the invention is not limited to the specific arrangement shown but in its broadest aspects it includes all equivalent embodiments and modifications which come with the scope of the invention.

What is claimed is:

1. A connecting clip assembly for connecting a wiper arm to a wiper blade, said wiper blade having between its ends an opening with opposite parallel side walls for receiving the connecting clip and the arm for pivotal movement therebetween, and a first pair of aligned holes in said opposite parallel side walls, the connecting clip comprising an elongate unitary body forming a pair of opposite parallel external side faces, a portion for supporting an end portion of a wiper arm longitudinally of the connecting clip including means for retaining the end portion of the wiper arm, a transverse opening through said body at right angles to the side faces terminating in a second pair of aligned holes through the side faces, and a separable pin of a length greater than the distance between the side faces extending through said first and second pairs of aligned holes and said transverse opening in assembled position, interlocking, cooperating abutment means on said body and said pin for retaining said pin in assembled position, the end portions of said pin pivotally engaging said first pair of aligned holes.

2. A connecting clip according to claim 1 wherein the said cooperating abutment means comprise a resiliently supported projection on said body extending toward the axis defined by said second pair of aligned holes and a circumferential groove in the pin for receiving the projection to thereby retain the pin in assembled position.

3. A connecting clip according to claim 1 wherein said unitary body is received between said opposite parallel side walls.

4. A connecting clip according to claim 1 wherein said transverse opening through said body comprises a bore extending between said second pair of aligned holes.

5. A connecting clip according to claim 4 wherein said abutment means comprises opposite sides of a recess in said body, said recess extending from said bore and a resiliently supported projection protruding from a circumferential surface of the pin.

6. A connecting clip according to claim 5 wherein said projection is formed on a segmental portion of the pin produced by dividing the pin longitudinally with a slot between the ends of the pin, the segmental portion being radially resilient with respect to the pin, thereby providing resilient support for said projection.

* * * * *